United States Patent [19]

Neights et al.

[11] Patent Number: 4,720,223
[45] Date of Patent: Jan. 19, 1988

[54] CONTROLLED PRELOAD, SELF-RETRACTING CAPTIVE FASTENER ASSEMBLY

[75] Inventors: Paul D. Neights; Jay M. Stafford, both of Torrance, Calif.

[73] Assignee: Rexnord Inc., Brookfield, Wis.

[21] Appl. No.: 731,810

[22] Filed: May 7, 1985

[51] Int. Cl.4 .............................................. F16B 43/00
[52] U.S. Cl. ..................................... 411/11; 411/347; 411/533; 411/544
[58] Field of Search ...................... 411/11, 8, 9, 10, 12, 411/13, 14, 347, 366, 378, 544, 155, 156, 147, 337, 533, 535, 536; 267/151, 162, 177, 28

[56] References Cited

U.S. PATENT DOCUMENTS

| | | | |
|---|---|---|---|
| 1,266,231 | 5/1918 | Dottl | 267/28 |
| 1,394,740 | 10/1921 | Klocke | 411/136 |
| 3,156,303 | 11/1964 | Hilder | 267/151 X |
| 3,418,880 | 12/1968 | Herlach | 267/162 X |

FOREIGN PATENT DOCUMENTS

| | | | |
|---|---|---|---|
| 0105609 | 4/1984 | European Pat. Off. | |
| 589054 | 5/1925 | France | 267/28 |
| 626493 | 5/1929 | France | 267/28 |
| 840835 | 7/1960 | United Kingdom | |
| 909775 | 11/1962 | United Kingdom | |
| 1099472 | 1/1968 | United Kingdom | |
| 1223521 | 2/1971 | United Kingdom | |
| 1549293 | 7/1979 | United Kingdom | |
| 2133493A | 7/1984 | United Kingdom | |
| 2156469A | 10/1985 | United Kingdom | |

OTHER PUBLICATIONS

U.K. Search Report—U.K. Appliation No. 8610998—one page.
Design News Article—Beryllium Structure Supports Elements of Rotor Mast Sight 6/3/85 pp. 142 through 144.

Primary Examiner—Gary L. Smith
Assistant Examiner—Adrian H. Whitcomb, Jr.

[57] ABSTRACT

The present invention provides a self-retracting, captive fastener assembly which allows the application of a controlled preload not requiring separate measurement during or after application. The assembly includes the use of a hold-out spring (31) which is isolated and fully retracts the assembly when the installed assembly is not engaged with a substructure. A housing (32) is provided for the hold-out spring (31) and contains the spring (31) when it is fully compressed. For the controlled preload, disc springs (40) are used. The shoulder (60) of the bolt shank portion (24) is staked so as to form protrusions (61,62,63,64) for captivating these mentioned elements upon the bolt. A removable, retaining element or stop-nut (50) is also provided for securement of the fastener to a first structure 65. The stop-nut (50) is constructed so that it must be seated against substructure (70) in order to achieve the controlled deflection of the disc springs (40) and thereby achieve the desired preload application.

5 Claims, 9 Drawing Figures

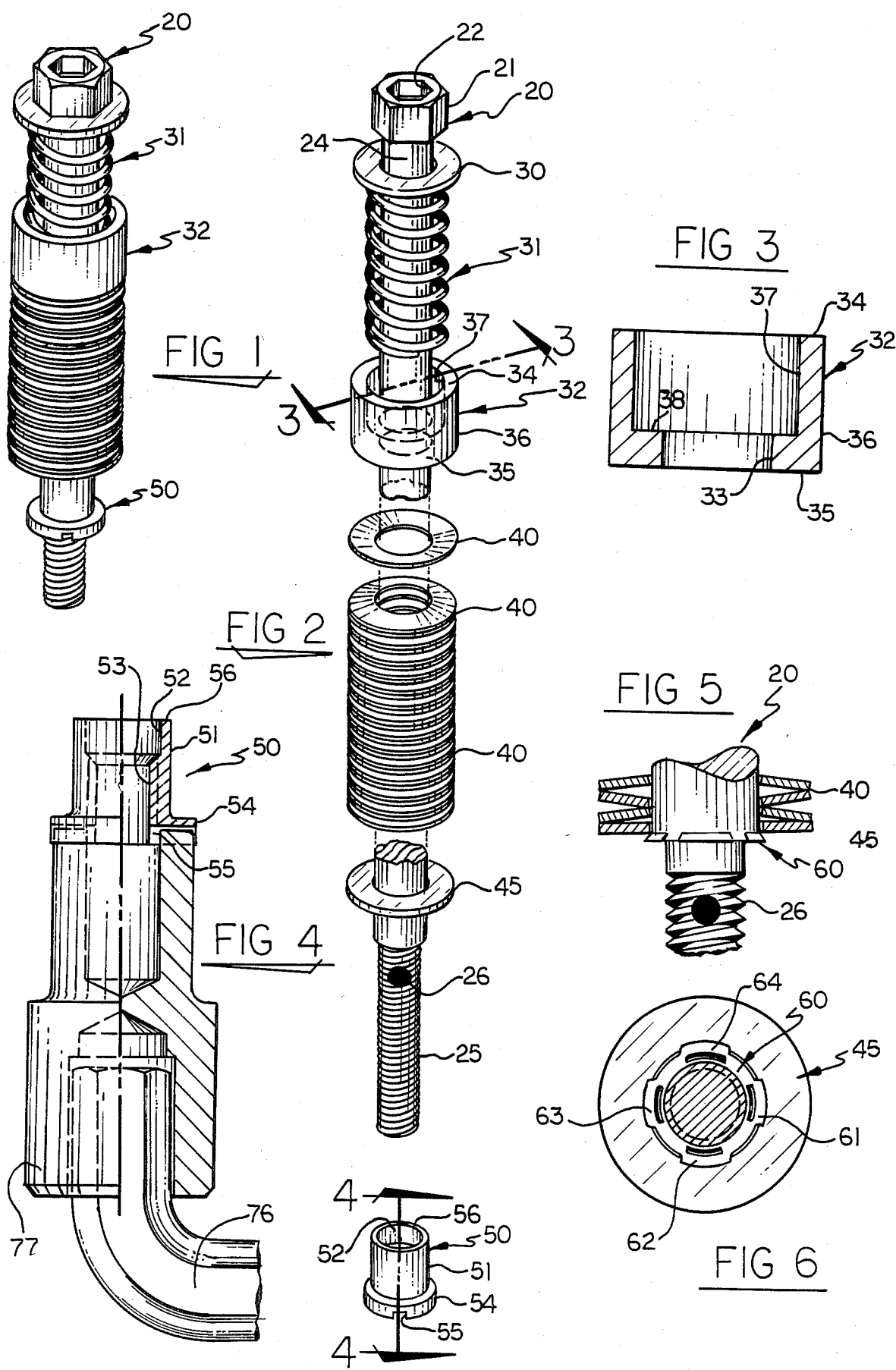

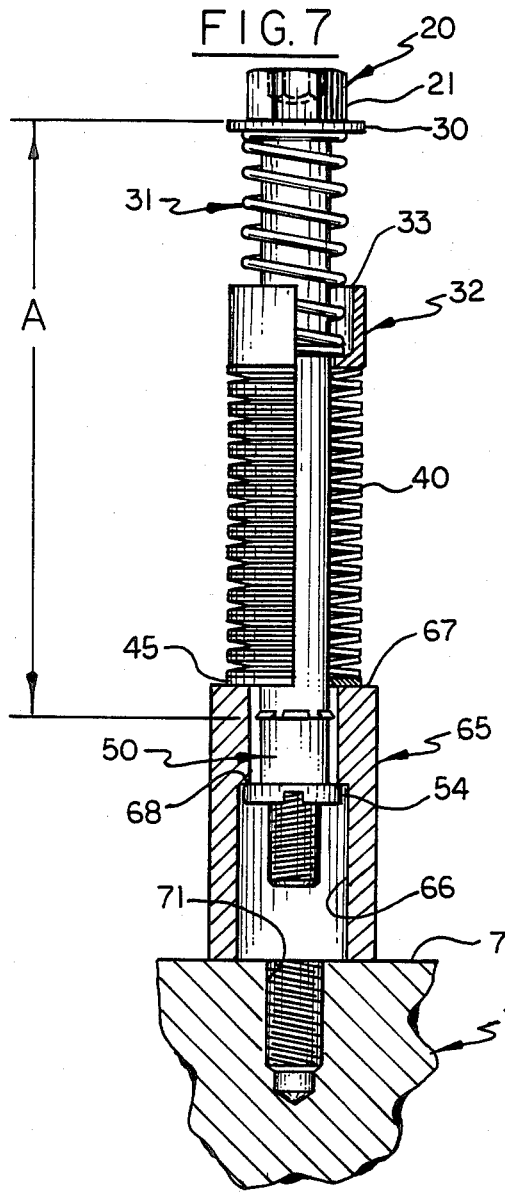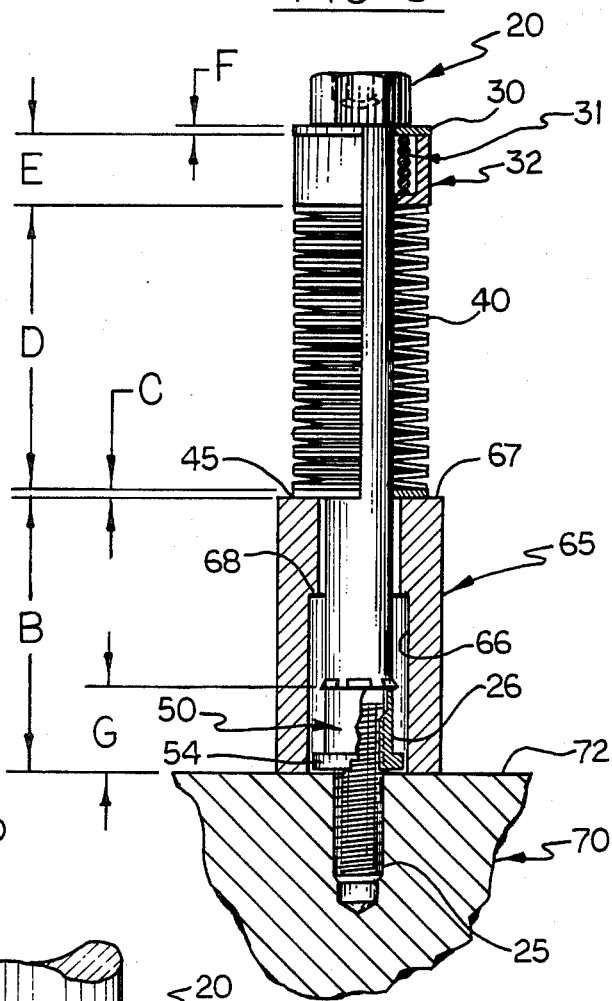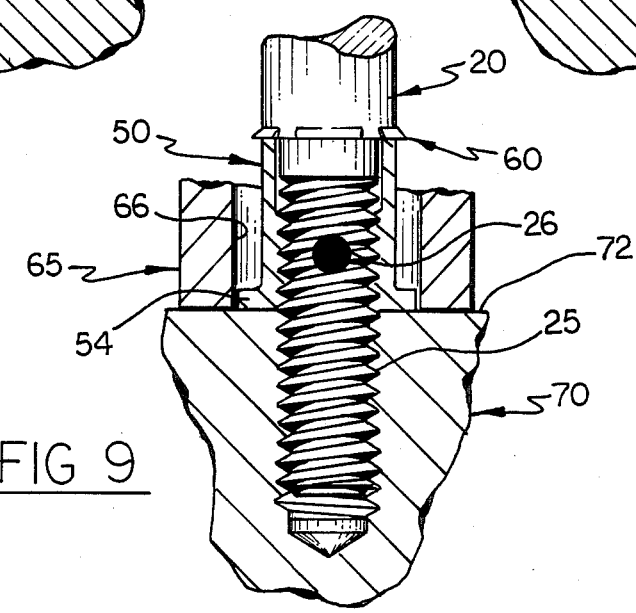

CONTROLLED PRELOAD, SELF-RETRACTING CAPTIVE FASTENER ASSEMBLY

TECHNICAL FIELD

The present invention relates to fastener assemblies and in particular to those assemblies which are self-retracting, have pre-captivated components and allow a controlled preload with controlled preload being defined as a predetermined amount of clamping force exerted by a fastener upon mating structures.

BACKGROUND

Known prior art assemblies to which the present invention relates have various shortcomings which are a source of problems for the industry, e.g., the aerospace industry. Often such problems have severe, if not adverse, consequences to the users. In an attempt to overcome the failings of the prior art, the present invention was developed. For example, one problem with compression spring-exerted preload devices is an increase in required installation torque as the spring compressed and preload increased. Use of the present invention results in a smooth, even installation torque. Another problem was the guesswork and resulting errors with determining when, if at all, the proper preload had been applied. This problem is eliminated by the invention's inherent deflection control design such that the separate measurements of the prior art devices are not required. Also, where the prior art devices have required assembly by the user at the installation site, the present invention pre-captivates the components to insure accurate assembly before delivery and reliable installation by the user.

SUMMARY OF THE PRESENT INVENTION

The invention may be summarized as a unique arrangement of components which result in a fastener assembly which is captive, provides a controlled preload, is self-retracting tne pre-captivates the components for the user. A pre-determined length of bolt is used with the hold-out spring being isolated from the preload spring mechanism. A removable stop-nut for retaining the installed assembly in a structure and providing deflection control is securely tightened locked upon the bolt during use.

These and other aspects of the invention will be more completely described in the description which follows.

BRIEF DESCRIPTION OF THE DRAWINGS

FIG. 1 is a view in perspective of a preferred embodiment of the present invention.

FIG. 2 is an exploded view in perspective of the preferred embodiment shown in FIG. 1.

FIG. 3 is a view in cross-section of a portion of the preferred embodiment as seen generally along lines 3—3 in FIG. 2.

FIG. 4 is an enlarged view in cross-section of a portion of the present invention as seen generally along lines 4—4 in FIG. 2, and of a driver tool.

FIG. 5 is an enlarged view in elevation and partial cross-section of a portion of the present invention subsequent to component captivation.

FIG. 6 is a bottom plan view of what is shown in FIG. 5.

FIG. 7 is a view in elevation and cross-section of the preferred embodiment as it would appear installed and fully retracted without any preload buildup.

FIG. 8 is a view in elevation and cross-section of the preferred embodiment as it would appear under preload.

FIG. 9 is an enlarged view in elevation and cross-section of a portion of the preferred embodiment shown in FIG. 8.

DETAILED DESCRIPTION OF A PREFERRED EMBODIMENT OF THE PRESENT INVENTION

With reference to FIGS. 1–4, the components of a preferred embodiment of the present invention will be described. FIG. 1 illustrates the preferred embodiment as finally assembled and ready for shipment to the customer. From this view it can be appreciated that all components of the assembly, with the exception of the stop-nut, are captivated prior to any shipment to the user for installation. A stop-nut is loosely secured to avoid loss or separation during shipment. The various other components include a fastener, a hold-out spring, a housing for the hold-out spring, a plurality of disc springs, and a pair of flat washers. The fastener 20, i.e. a bolt in the preferred embodiment has an uppermost portion or head 21. In the preferred embodiment a hex head with a bottom surface and a hex recess 22 is selected. The head configuration however, is not limited to any particular design. Extending a predetermined distance beneath the head 21 is a shank portion 24 having a preselected outer diameter which allows certain of the other components to be stacked on the bolt along the length of the shank portion 24. This preselected outer diameter is oversized in relation to the lowermost end of the bolt, and thus creates a shoulder on the bolt. At the lowermost end 25 of the bolt 20 a screw thread is provided. A nylon locking pellet 26 of conventional design is provided at a location on the threaded bolt end 25 near the lowermost end or shoulder of the outer wall of the shank portion 24. This is a preferred type of locking mechanism, however, other types which are equally suitable may also be used rather than a locking pellet.

The remaining components of the preferred embodiment are placed on the bolt shank portion in the following order: A flat washer 30 is placed immediately beneath the bolt head 21. The washer 30 has an inner diameter slightly greater than the bolt outer diameter. A holdout, coil spring 31 and a housing or cup 32 for the spring 31 are situated next on the bolt shank 24. The spring 31 and the cup 32 are constructed such that the spring when compressed fits completely within the cup interior 33 and is essentially isolated. The spring 31 is a readily available commercial item and is biased so as to retract the bolt upwardly or in a direction away from the underlying structure, as illustrated in FIG. 7. The cup 32 has an open top end 34, a bottommost surface 35, an outer wall 36, an internal bore 33 extending through the cup, and a counterbore 37 extending from the top end 34 through to an internal surface 38 located above the bottommost surface 35. The diameter of the counterbore is slightly greater than the outer diameter of the spring 31 to allow the spring to freely locate within the cup without interference. See FIG. 3.

In FIG. 2 it can be seen that immediately beneath the spring cup 32, a plurality of disc springs or conical spring washers 40 are stacked upon each other. This type of spring mechanism may be commonly referred to as a belleville washer stack. The number of disc springs used is determined by the desired pre-load and permissible deflection available to the installed assembly. Standard disc springs of this type are commercially available and provide predictable load and deflection characteristics. Disc springs 40 are preferred as they provide a uniform application of pressure which will be substantially maintained despite any variance in bolt tension caused by such common occurrences as thermal expansion and contraction or ordinary wearing of parts. Persons skilled in the art may readily determine the particular stacking arrangement and number of disc springs for a particular application depending on the dimensional envelope available and the desired preload which the disc springs are to provide. Thus further discussion of the sizing and functioning of the disc springs 40 is believed unnecessary to enable one skilled in the art to practice the invention.

Immediately beneath the bottommost disc spring is a second flat washer 45, which serves as a bearing surface and a retainer for the disc springs 40. Finally, a stop-nut 50 is secured loosely upon the lower threaded portion 25 of the bolt. The stop-nut 50 as can be seen in FIG. 2 includes a tubular body portion 51 having a top surface 56, and an uppermost countersunk portion 52 formed integral with a lowermost internally threaded portion 53. At the lowermost end of the stop-nut 50 a flange 54 is provided. A pair of oppositely arranged recesses 55 are provided on the flange 54 to allow a tool to grip the stop-nut for securely torqueing the stop-nut 50 upon the nylon locking pellet 26 and for removing the nut 50 from same when desired. The tool used is shown engaging the stop-nut in FIG. 4. In the preferred embodiment a conventional hex wrench 76 is used with a driver 77 added in order to reach the stop-nut within the structure 65.

FIGS. 5 and 6 illustrate the manner in which the disc springs and flat washers 30, 40, 45, the holdout spring 31, and the spring cup 32 are permanently held upon the bolt 20. The shoulder or terminal end 60 of the smooth outer wall of the oversized bolt shank portion is deformed outward into a stake mark configuration in any conventional manner. In the preferred embodiment this area 60 is punched or staked in four separate areas such that the shoulder 60 protrudes beyond the oversized shank periphery at four separate areas 61, 62, 63, 64. In this way the otherwise free components located between the bolt head 21 and the staked area are captivated.

To install the assembly in a first structure 65 a simple procedure is followed. The stop-nut 50 is removed from the bolt 20. The bolt threaded end 25 is inserted from one side 67 of the structure 65 through a counterbore 66 in the structure 65. The stop-nut 50 is then reinstalled on the threaded end portion 25 of the bolt 20 from the opposite side of the structure 65, over the interference-fit, locking pellet 26 and securely tightened thereon. At this point the top surface 56 of the stop-nut 50 is in direct contact with the shoulder 60 of the oversize bolt shank. From FIG. 7 it can be appreciated that when the fastener is in a fully retracted state, the top surface of the flange 54 abuts the base 68 of the counterbore 66. The invention is thus captivated to the first structure 65 and ready for its intended use.

The operation of the invention may now be appreciated. FIG. 7 illustrates the preferred embodiment captivated in a first structure 65 and ready for securing the first structure 65 to a substructure 70. The bolt is in a fully retracted position and there is as yet no preload. Using an appropriate tool (not shown) the user rotates the bolt head while simultaneously exerting a downward axial force upon the assembly. The hold-out spring 31 is compressed into its cup 32, while the unpreloaded screw thread portion 25 engages the internal threads of the prepared opening 71. The lowermost or retaining washer 45 abutting the first structure surface 67 allows the bolt to move freely relative to the disc springs 40. As the threaded portion 25 of the bolt 20 engages the substructure opening 71, the disc springs 40 are each initially at their free length. The engagement of the bolt with the substructure opening 71 continues, causing deflection of the disc springs 40 until the stop-nut flange 54 is seated upon the substructure surface 72. Not until the seating of the stop-nut flange 54 occurs will the desired preload be achieved by the controlled compression of the disc springs 40. When the stop-nut flange is seated, the installer will appreciate the sudden resistance to further torque. Thus the arrangement of the elements provides a positive stop for the user in the operation of the invention.

It should now be apparent to one skilled in the art that for a proper use of the invention certain height relationships are important. For the preferred embodiment a formula has been devised to achieve the desired height relationships. With reference to FIGS. 7 and 8 the formula is $A=B+C+D+E+F-G$. A is defined as the bolt length as measured from beneath the bolt head 21 to the bottom of the shoulder or staked area 60. B is the distance from the bearing surface beneath the flat washer 45 to the surface 72 of the substructure 70 which the stop-nut flange is seated upon after the preload is achieved. C is the height or thickness of the flat washer 45. D represents the height of the stacked disc springs 40 when they are at pre-load. E is the height of the spring housing 32. F is the height or thickness of the flat washer 30. G is the height of the stop-nut 50. Of course other formulas may be devised for calculating the proper bolt length for the effective operation of the invention.

From the foregoing the distinctive features of the invention clearly include the pre-captivation of the various components before shipping and installation; a smooth, slight torque, preload buildup for achieving the desired load; no requirement of any separate measuring tools to confirm the accuracy of the final preload; an isolation of the retracting spring from the preload spring mechanism, and a unique removable retaining stop-nut and shoulder area of the bolt which eliminates the guesswork involved with the prior art where stop elements had to be cemented in place at an effective location.

The preferred embodiment illustrates one construction for the unique controlled preload, self-retracting, captive assembly of the present invention. Of course other embodiments may be possible and accordingly, the invention is believed limited solely by the claims which follow.

What is claimed is:

1. A self-retracting, controlled preload, captive fastener assembly adapted for installation in a first structure and securement with a second structure, said fastener assembly comprising:
   a fastener having a predetermined length, an uppermost end, a lowermost end, a head at said uppermost end and a threaded portion proximate said lowermost end;

means, intermediate said fastener ends and captivated along said fastener length, for applying a predetermined preload when said fastener installed in a first structure is secured to a second structure;

means, isolated from said means for applying a predetermined preload, for biasing said fastener in a first direction relative to the second structure in which said fastener is installed, said means for biasing said fastener being captivated on said fastener length proximate said fastener uppermost end; and stop means, on said shank portion, for positioning said fastener, said means for applying a predetermined preload, and said means for biasing said fastener relative to a second structure for applying a controlled preload to the second structure.

2. The fastener assembly of claim 1 wherein said fastener further includes a shank portion having an outer wall proximate said uppermost end and a threaded portion proximate said lowermost end, and said means for applying a predetermined preload includes a plurality of disc springs stacked upon each other about said shank portion outer wall.

3. The fastener assembly of claim 2 wherein said fastener further includes a plurality of protrusions, formed integral with said shank portion outer wall, which together with said fastener head captivates said means for applying a predetermined preload and said means for biasing said fastener on said shank portion.

4. The fastener assembly of claim 2 wherein said fastener further includes a shoulder portion connecting said outer wall and said threaded portion, and said stop means includes a removable stop-nut adapted to abut said shoulder and to abut the second structure whereby further application of the preload is prevented.

5. A self-retracting, controlled preload, captive fastener assembly adapted for installation in a first structure and securement in a second structure, said fastener assembly comprising:

a fastener having a predetermined length, an uppermost end, a lowermost end, a head at said uppermost end, and a shank portion having an outer wall proximate said uppermost end and a threaded portion proximate said lowermost end;

means, intermediate said fastener ends and captivated along said shank portion outer wall, for applying a predetermined preload when a first structure is secured to a second structure by said fastener assembly, said means including a plurality of disc-shaped springs stacked upon each other about said shank portion outer wall; and stop means on said fastener for positioning said fastener and said means for applying a predetermined preload in an arrangement with respect to the secured first and second structures in a manner permitting achievement of the desired controlled preload, said stop means being a removable stop-nut constructed and arranged to abut said shank portion intermediate said outer wall and said threaded portion, and to abut the second structure whereby further application of the preload is prevented, said fastener including a plurality of protrusions formed integral with said shank portion outer wall, said springs and said means for biasing said fastener being captivated on said shank portion between said protrusions and said fastener head.

* * * * *

UNITED STATES PATENT AND TRADEMARK OFFICE
CERTIFICATE OF CORRECTION

PATENT NO. : 4,720,223

DATED : January 19, 1988

INVENTOR(S) : Paul D. Neights and Jay M. Stafford

It is certified that error appears in the above—identified patent and that said Letters Patent is hereby corrected as shown below:

Column 1, line 42, cancel "tne" and insert --and--.

Claim 1, column 5, line 11 cancel "shank portion" and insert --fastener length--.

Claim 5, column 6, line 10, cancel "and"; after line 18 and before line 19, insert the following paragraph -- means, isolated from said means for applying a predetermined preload, for biasing said fastener in a first direction relative to the second structure in which said fastener is installed, said means for biasing said fastener being captivated on said fastener length proximate said fastener uppermost end;--; line 28, change the comma (,) to a semicolon (;) and line 30, change the comma (,) to a semicolon (;).

Signed and Sealed this

Sixth Day of June, 1989

*Attest:*

DONALD J. QUIGG

*Attesting Officer*   *Commissioner of Patents and Trademarks*